United States Patent

[11] 3,623,439

[72] Inventors John E. Hair, Jr.
  Prescott;
  Richard E. Hair, Walla Walla, both of Wash.
[21] Appl. No. 865,099
[22] Filed Oct. 9, 1969
[45] Patented Nov. 30, 1971
[73] Assignee Deere & Compnay
  Moline, Ill.

[54] SEED DRILL FURROW OPENER
  7 Claims, 5 Drawing Figs.
[52] U.S. Cl. .................................................. 111/85,
  111/88, 172/176
[51] Int. Cl. ..................................................... A01c 5/00
[50] Field of Search ........................................ 111/85, 86,
  87, 88; 172/176

[56] References Cited
  UNITED STATES PATENTS

| | | | |
|---|---|---|---|
| 3,180,291 | 4/1965 | Loomans | 111/85 |
| 3,177,830 | 4/1965 | Zimmerman | 111/85 |
| 3,319,590 | 5/1967 | Zimmerman | 111/85 |
| 705,598 | 7/1902 | McCain | 111/88 |
| 730,797 | 6/1903 | Rentsch | 111/88 |
| 1,094,422 | 4/1914 | Bottom | 111/85 |
| 1,104,725 | 7/1914 | Aspinwall | 111/88 |
| 2,734,439 | 2/1956 | Padrick | 111/88 |
| 3,093,196 | 6/1963 | Nakatani | 111/88 |
| 3,228,363 | 1/1966 | Gardner et al. | 111/88 |
| 3,237,702 | 3/1966 | Orendorff | 111/85 |
| 3,387,576 | 6/1968 | Gordon | 111/85 |

FOREIGN PATENTS

| | | | |
|---|---|---|---|
| 75,954 | 1/1891 | Germany | 111/88 |
| 21,691 | 12/1905 | Sweden | 111/88 |

Primary Examiner—Robert E. Pulfrey
Assistant Examiner—C. W. Hanor
Attorney—Norman H. Huff ABSTRACT: A seed drill in which a furrow opener, serving as the lower portion of the seed delivery tube, is laterally narrow. A pair of press-wheel disks having sharp rims, one at each side of said furrow opener and in close tolerance, is journaled for rotation on axes or an axis substantially at the trailing edge of the said opener and the disks are sufficiently large diametrically to dispose the forward portion of their sharp rims substantially ahead of the leading edge of the furrow opener; the disk axes being vertically adjustable with respect to the said furrow opener. When the said rims are in parallel planes, a soil guard disposed therebetween minimizes the quantity of soil that may pass between the disks.

JOHN E. HAIR Jr.
RICHARD E. HAIR
INVENTORS.

BY Norman W. Buff

INVENTORS
JOHN E. HAIR Jr.
RICHARD E. HAIR

SEED DRILL FURROW OPENER

Our invention relates to seed drills of the type that employ a furrow opening point vertically adjustable to provide a furrow of a preselected depth and is associated with a seed tube open to direct a succession of seeds into the furrow so opened. More particularly, the invention is an improved furrow opener in the aforesaid reference which has means for covering the seeds deposited thereby to a predetermined depth without regard to the depth of the furrow, within reason.

Our invention is an improvement over U.S. Pat. Nos. 3,319,590 and 3,385,243; wherein press wheels are associated with furrow openers and include rim flanges which during use are disposed at or rearwardly of the leading edge of the furrow opener.

It is therefore a principal object of our present invention to provide a furrow opener for grain drills which facilitates selective adjustment of the depth of the furrow opener and also selective vertical adjustments of the press-wheel disks with respect to the furrow opener.

A further object of the invention lies in the provision of the aforesaid furrow opener wherein the press-wheel disks are of such relative diameter as to facilitate positioning their vertical diameters near the trailing edge of the furrow opener and still present their sharp circumferential rims forwardly of the furrow opener.

A still further object of the present invention is to provide means for minimizing the passage of soil between the disks and the furrow opener disposed therebetween.

The foregoing and other objects and advantages of the present invention will become more apparent and meaningful during the course of the following specification when considered in association with the accompanying drawings wherein a preferred form of the invention is graphically illustrated. It is to be understood, however, that the drawings are illustrative only and are not intended to limit the scope of the invention. It should be also understood that various changes in construction may be resorted to in the course of manufacture without in any way departing from the spirit of the invention which is to be understood only in accordance with the appended claims. Furthermore, it is to be understood that while the invention is described in one particular association, it is not our intention to unnecessarily limit the applicability of the invention but we desire to reserve to ourselves the claimed invention for every use of which it is now known or subsequently discovered to be susceptible.

Other advantages and features of this invention will become apparent from the more detailed description following in which like reference numerals are employed to designate similar parts in the accompanying drawings, wherein.

Figure 1:
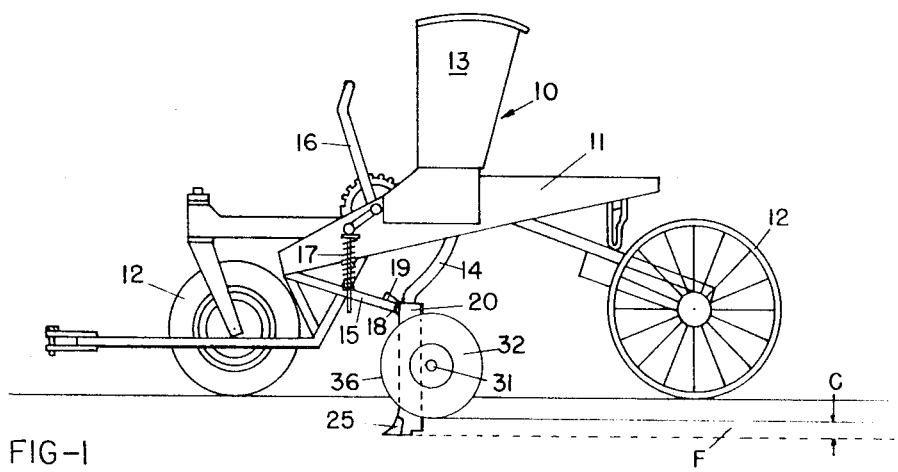
FIG. 1 is a side elevation of a seed drill having the present invention.

Having reference now to the drawings in greater detail, we have shown a conventional grain drill 10 which includes a main frame 11, mobilized by ground-engaging support wheels 12—12 which are shown disposed fore and aft, but may be located at the lateral ends of the drill 10 as is conventional in some currently marketed equipment. A seed hopper 13 is carried by the frame and is provided with any of the common and well-known seed discharging devices (not shown) adapted to discharge, at a predetermined rate, successions of seeds into the plural seed delivery tubes 14, and one of which is shown.

Pivotally connected to the frame 11 we show one tool arm 15 which is movable in a vertical plane by means of the lever 16 to manually selected positions and yieldably held at such selected positions by spring 17 in the common manner. It will be understood, that there are plural arms 15, each of which supports a furrow opener 20, by disposing a pin or bolt 18 through aligned apertures (not shown) in the rearward bifurcation of arm 15 and the bore 21 in the interposed flange 22. Angular adjustment of the furrow opener, with respect to the arm 15 is effected by inserting a shear pin 19 through a selected bore 23—23 above the bifurcated end of arm 15 in the conventional manner.

It should be noted that the furrow opener 20 may be fabricated from rigid metal parts to form a laterally thin vertical leg having a hollow core which constitutes a lower portion 24 of the seed delivery tube 14, which lower portion is open at its lower end to facilitate deposit of the successive seeds S—S in the furrow F formed by the furrow opener 20 having a forwardly arched shoe 25 at its toe, removably secured thereon by a bolt at 27.

A tongue 26 extends rearwardly from the shoe and terminates at the tube portion 24 and serves to form at the bottom of the furrow F an escape route for the seeds S as they fall from the tube portion 14.

Spaced above its lower end a suitable distance, we weld or otherwise secure on the trailing edge of the furrow opener 20 a vertically elongate mounting block 28 having a series of vertically spaced axially lateral bores 29 therethrough which are adapted to removably receive a pin or bolt 30 which extends through axially aligned holes 40—40 in spaced arms 41—41 of an arcuate guard member 42 bifurcated at its lower end 43 to receive the furrow opener 20 therebetween.

The arc of the guard 42 is generated from an axis coincidental to a bearing sleeve 44 affixed to the rearward ends of said arms, as by welding, and extending laterally of the furrow opener 20 adjacent to its trailing edge.

A wheel shaft 31 is journaled in said bearing sleeve 44 and carries on its ends frustoconical press-wheel disks 32—32. The disks 32—32 may be mounted to the shaft 31 in any desired manner as, for example, flanged sleeves 33—33 to which the disks 32—32 are secured by stud bolts 34—34, are releasably fixed to the ends of the shaft 31 by means of set bolts 35—35. Obviously, if desired, the shaft could be fixed, and the disks 32 journaled thereon; it being desirable that the disks 32 be freely rotatable, either independently of each other or together as a unit.

The arcuate rims 36 are sharp, not flanged, as in the prior art, so that they will assist in opening the furrow F, thus minimizing the pulling force required, cutting debris and guiding a maximum amount of soil away from the center of the furrow opener 20. It is to be noted that in the preferred embodiment each rim 36 lies in a vertical plane, parallel to the other end and as near to the lateral sides of the furrow opener as is practical.

Figure 3:
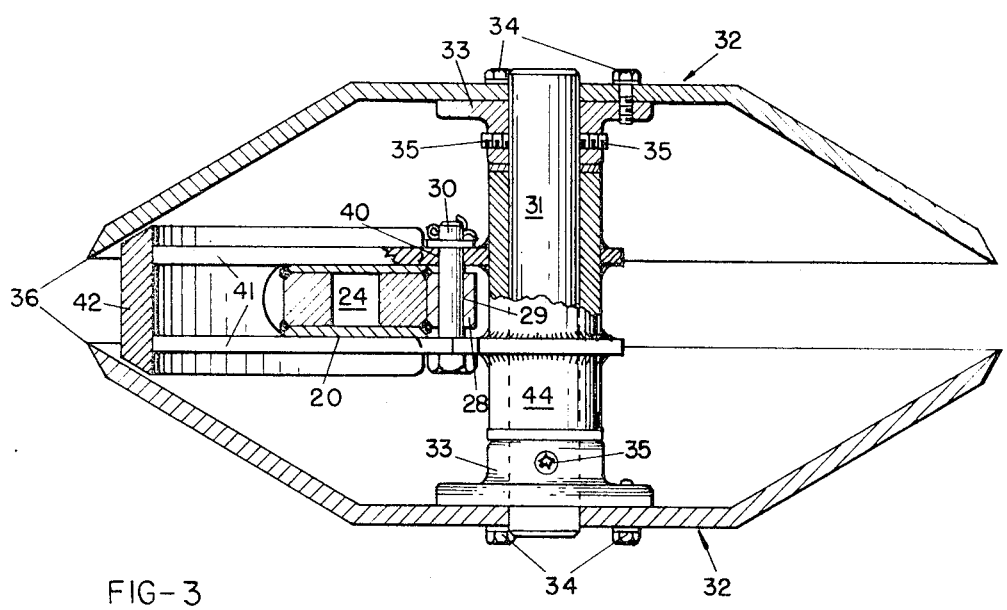
FIG. 3 is a lateral section through said assembly on a horizontal plane indicated by line 3—3 of FIG. 2 and on a slightly reduced scale.

Since the disks 32—32 are substantially concavo-convex in section (FIG. 3) the guard 42 is disposed between the disks 32—32 forwardly of the furrow opener 20 and has its lateral edges shaped and disposed to have a close tolerance relationship with the concave inner faces of said disks 32—32. This structure minimizes the amount of soil which is allowed to pass between the disks.

The depth of furrows F is dictated by the manual positioning of the lever 16, and the depth of soil cover C is determined by the vertical adjustment of the press-wheel disks 32—32.

Figure 2:
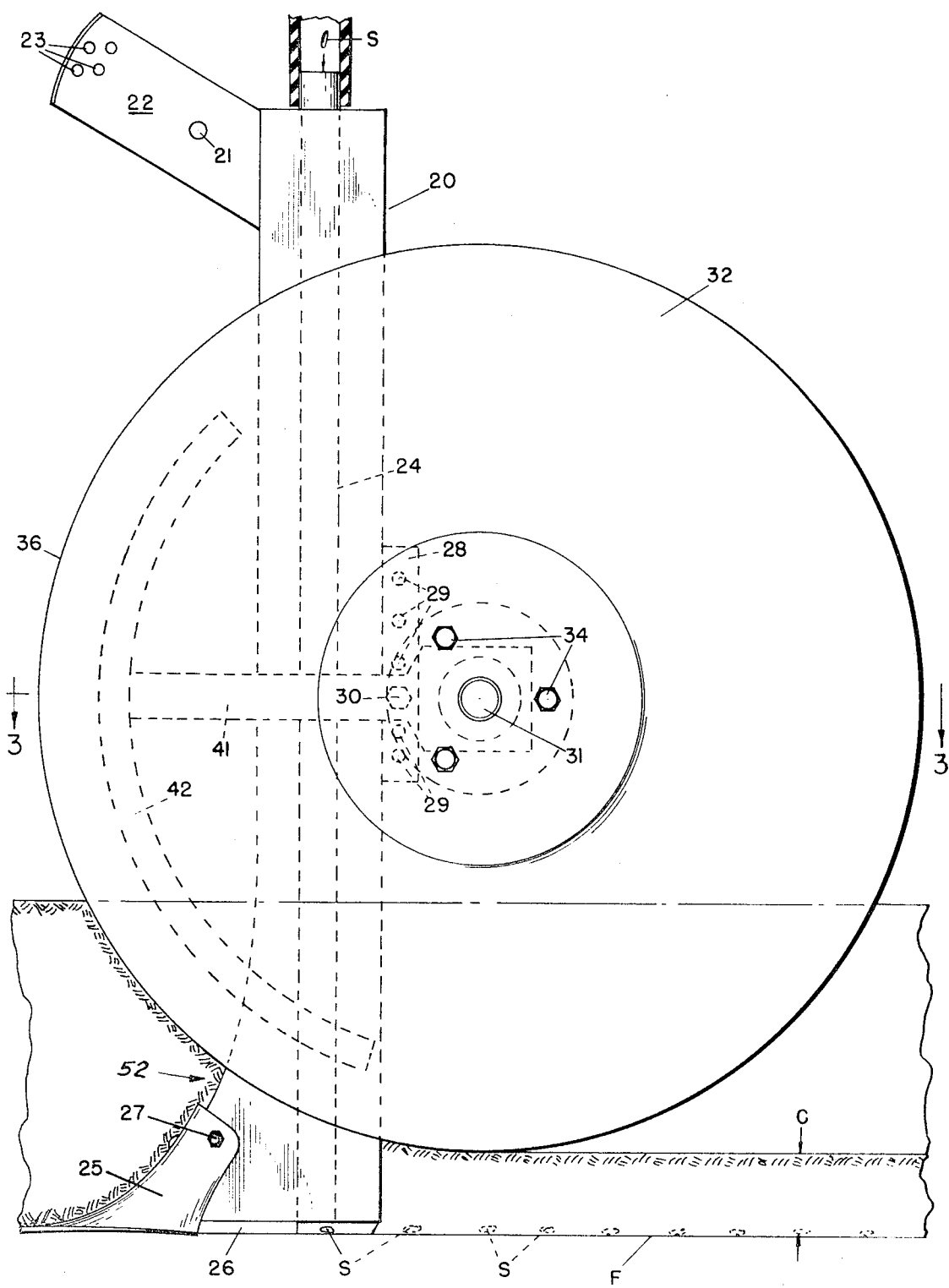
FIG. 2 is an enlarged side elevation of the furrow opener/press-wheel disks assembly with a portion of the seed delivery tube in section.
Figure 4:
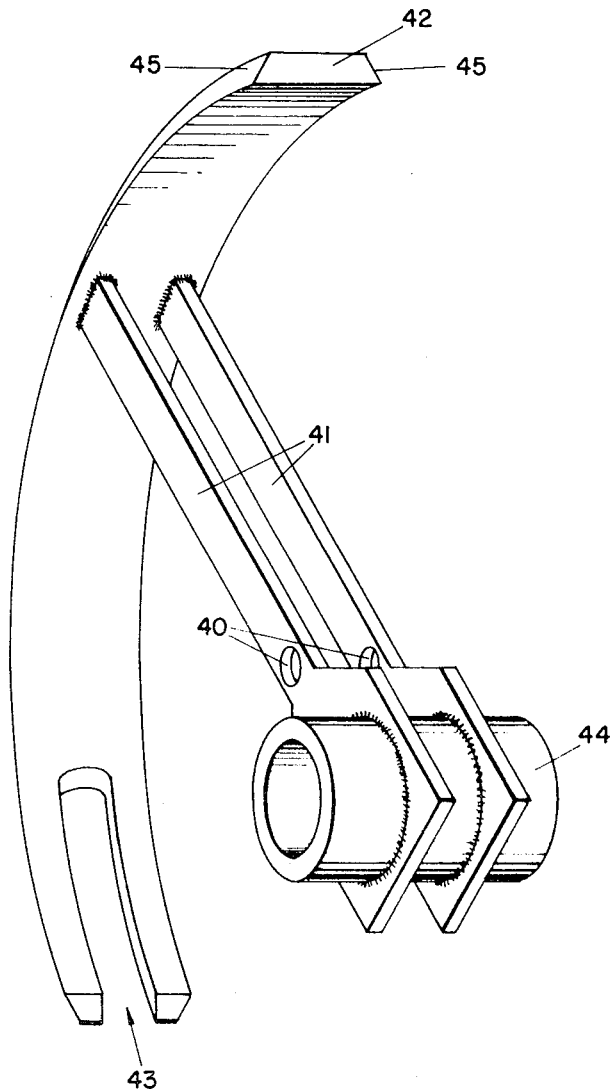
FIG. 4 is an isometric of the preferred dirt-deflecting means which serves to adjustably mount the press-wheel disks to the furrow opener.

In operation, the furrows are neatly cut and trash is easily severed by the sharp rims 36 of the disks 32. Inspection of FIG. 2 will reveal that the arch of shoe 25 and the lower end front configuration of the furrow opener 20 together with the adjacent portions of the sharp rims 36 define a subsurface V-shape saddle 52 into which trash on the surface and subsurface tends to be directed, if not sooner severed. The furrow opener, being rigid, serves as a shear bar to hold any trash which may migrate to this point while the sharp rims 36 of rotating discs slices through the trash so held thus resulting in less draft effort being required and more consistent formation of furrows and seed covering. The trash cannot escape upwardly between the discs because it is precluded therefrom by the guard 42. The conical shapes of the cooperating disks 32 press the soil into a V-shape section to the desired depth and the moist soil is allowed to fall back over the seed from a horizontal plane coincident to the lowermost rim position of the disks 32 to a manually adjusted depth C. The vertical diameters of the disks 32 are on a plane disposed in near spaced relation to the trailing edge of the furrow opener 20 to preclude earth falling behind the trailing edge of the furrow opener and forwardly of the disks wherein control of the covering depth C is lost.

Figure 5:
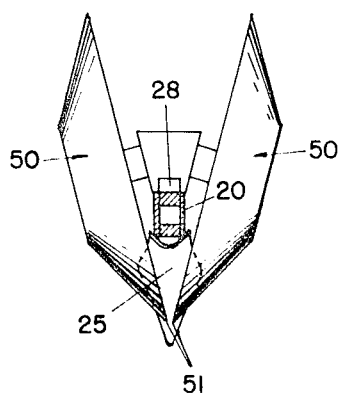
FIG. 5 is a reduced scale plan view of a modified furrow opener/press-wheel disks assembly.

Figure 5 shows a furrow opener 20 wherein the press-wheel disks 50—50 have their sharp rims 51—51 disposed on vertical planes but angularly related to each other to dispose their leading edges in near relationship to each other. In this species the need for the guard 42 is obviated.

Having thus described our invention, we desire to secure by Letters Patent of the United States the following:

1. In a seed drill having a mobile frame and a seed hopper with a plurality of seed outlets, each adapted to discharge seeds in succession into a seed delivery tube having a lower portion open at its lower end, the improvement comprising:
   a rigid, laterally thin, vertically adjustable furrow opener carried by the frame and extending forwardly of the lower portion of said seed delivery tube at its lower end;
   a pair of disks having generally conical outer faces extending outwardly from their rims toward their axes;
   the rims of said disks being sharp and lying in vertical planes one at each lateral side of said furrow opener in near spaced relationship thereto; journaled for rotation about their axes and extending forwardly of said furrow opener and together therewith defining a V-shape saddle disposed below the ground surface during seeding operation;
   said disks being disposed to place their vertical diameters sufficiently near a vertical lateral plane at the trailing edge of said furrow opener and delivery tube to press the opener-separated soil into sloping compacted sidewalls from the rims of the disks upwardly, whereby the soil separated by said opener below a horizontal plane at the bottom of said rims will fall back to cover the seeds discharged from the lower end of said tube; and
   means for adjusting the said disks vertically with respect to said furrow opener, whereby to selectively vary the depth of covering for said seeds.

2. The device defined in claim 1 wherein:
   the planes of the rims of said disks are substantially parallel, whereby the forwardly presented sharp rims are spaced from each other; and
   means for minimizing the passage of soil between said disks.

3. The device defined in claim 1 wherein:
   said disks are supported for vertical adjustments by means adjustably fixed on said furrow opener.

4. The device defined in claim 2 wherein:
   said disks are supported for vertical adjustments by means adjustably fixed on said furrow opener.

5. The device defined in claim 2 wherein:
   said means for minimizing the passage of soil between the disks comprises:
   a guard having at least a portion disposed forwardly of said furrow opener and having its laterally disposed edges between and in close tolerance to said spaced disks and extending circumferentially from a point above the soil's surface downwardly and rearwardly to substantially the said trailing edge of said furrow opener.

6. The device defined in claim 5, wherein:
   said guard is bifurcated at its rearward end and in straddling relationship with respect to said furrow opener.

7. The device defined in claim 5, wherein:
   spaced parallel arms secure to and extend rearwardly from said guard and straddle said furrow opener;
   a vertical mounting block fixed rearwardly of and relative to said furrow opener and having a series of vertically spaced axially lateral bores therethrough;
   said arms having axially aligned holes selectively positionable companion to each bore, whereby to serve as said means for adjusting the said disks vertically; and
   a lateral shaft carried by said arms rearwardly of said holes and carrying said disks at the ends thereof for rotation.

* * * * *